(12) United States Patent
Clark et al.

(10) Patent No.: US 9,181,113 B2
(45) Date of Patent: Nov. 10, 2015

(54) METHOD AND SYSTEM FOR INJECTING RF SIGNAL INTO A FLUID-CONTAINING SYSTEM

(75) Inventors: Martin Clark, Lymington (GB); Mark Meyer, Fox Point, WI (US); George Rihovsky, Foothill Ranch, CA (US)

(73) Assignee: MSL OILFIELD SERVICES LIMITED, Poole (GB)

( * ) Notice: Subject to any disclaimer, the term of this patent is extended or adjusted under 35 U.S.C. 154(b) by 1176 days.

(21) Appl. No.: 13/035,419

(22) Filed: Feb. 25, 2011

(65) Prior Publication Data

US 2012/0217815 A1 Aug. 30, 2012

(51) Int. Cl.
*H01F 38/00* (2006.01)
*C02F 1/48* (2006.01)
*C02F 1/00* (2006.01)
*C02F 103/02* (2006.01)

(52) U.S. Cl.
CPC .............. *C02F 1/487* (2013.01); *C02F 1/008* (2013.01); *C02F 2103/023* (2013.01); *C02F 2303/04* (2013.01); *C02F 2303/14* (2013.01); *C02F 2303/22* (2013.01)

(58) Field of Classification Search
CPC ............. H01F 38/00; B03C 1/00; C02F 1/48; B01J 19/12
USPC ............... 210/748.01, 748.47, 739, 695, 243, 210/222, 223, 143, 167, 87; 422/186.01, 422/186.02, 186.03, 186.29; 307/104, 109, 307/112; 366/82, 175, 186, 206, 223, 62, 366/174, 195, 695
See application file for complete search history.

(56) References Cited

U.S. PATENT DOCUMENTS 3,263,182 A * 7/1966 Opolski et al. .............. 331/71
5,514,283 A 5/1996 Stefanini
5,649,507 A 7/1997 Gregoire et al.
5,667,677 A 9/1997 Stefanini (Continued)

FOREIGN PATENT DOCUMENTS

CN 2217618 Y 1/1996
WO 2004014512 A2 2/2004

OTHER PUBLICATIONS

"Supplementary European Search Report," received in EP Application No. 12749907, completed Aug. 21, 2014 (2 pages).

*Primary Examiner* — Walter D Griffin
*Assistant Examiner* — Cameron J Allen
(74) *Attorney, Agent, or Firm* — Tillman Wright, PLLC; James D. Wright; David R. Higgins

(57) ABSTRACT

A method and system for injecting a pulsed radio frequency signal into a fluid-containing system in order to create and propagate an electromagnetic field throughout the fluid-containing system. The electromagnetic field may be used to prevent the formation and build-up of scale in the fluid-containing system and/or to prevent the proliferation of bacteria within the fluid-containing system. The method and system may also be used to inject a pulsed radio frequency signal at a number of points in a fluid-containing system, or to inject a pulsed radio frequency signal to a number of independent fluid-containing systems.

17 Claims, 1 Drawing Sheet

(56) References Cited

U.S. PATENT DOCUMENTS

| | | | |
|---|---|---|---|
| 5,935,433 A * | 8/1999 | Stefanini | 210/222 |
| 7,361,255 B1 | 4/2008 | Kuhry | |
| 7,378,063 B1 * | 5/2008 | Wyles | 422/186.29 |
| 2003/0222664 A1 | 12/2003 | van de Goor et al. | |
| 2005/0145509 A1 * | 7/2005 | Sams | 205/742 |
| 2008/0185328 A1 | 8/2008 | Stefanini | |
| 2009/0236294 A1 * | 9/2009 | Wittmer et al. | 210/748 |
| 2010/0186958 A1 | 7/2010 | Stefanini | |

* cited by examiner

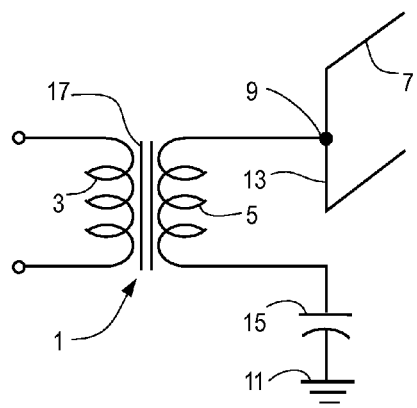
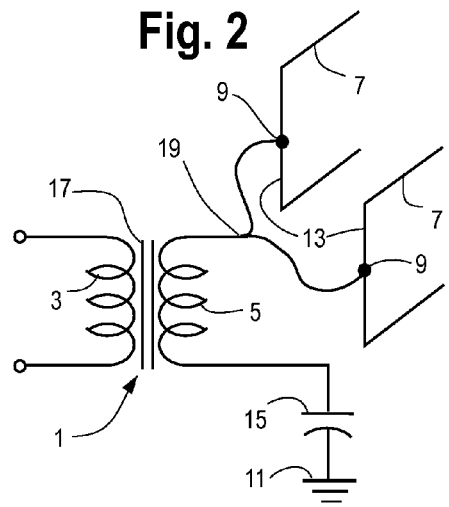
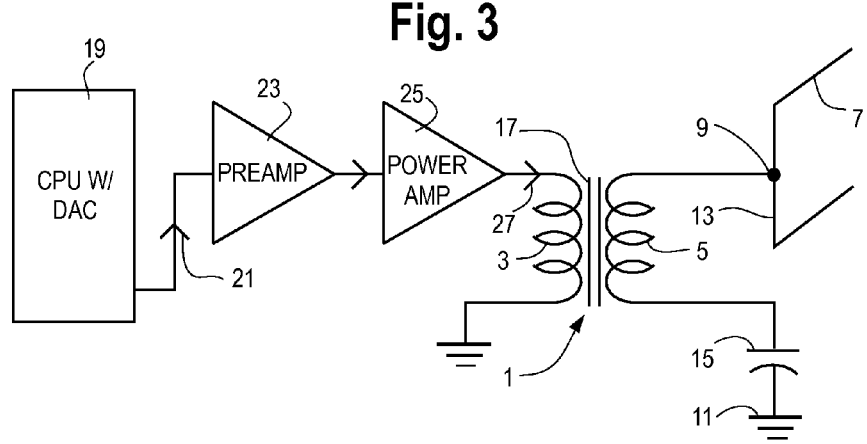
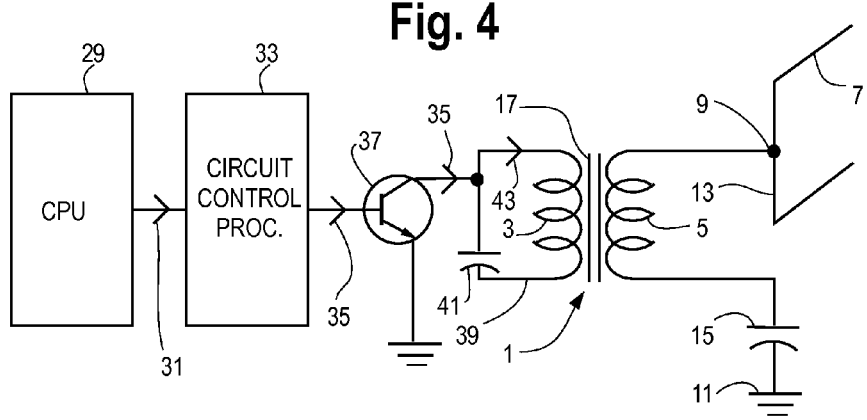

METHOD AND SYSTEM FOR INJECTING RF SIGNAL INTO A FLUID-CONTAINING SYSTEM

BACKGROUND OF THE INVENTION

The present invention generally relates to a method and a system for treating a fluid-containing system in order to resist the formation and build-up of scale deposits.

Scale is the build-up of mineral salt deposits on internal surfaces of fluid-containing equipment, such as pipes. In particular, calcium and magnesium, which are commonly contained in water, are heavily involved in the formation of scale.

Scale is formed when mineral ions present in a fluid reach conditions at which they change phases from liquid to solid. Ions present in a fluid require energy to begin the process of forming a solid. Formation of a solid on an existing surface, such as the internal surface of a pipe, requires less energy. Accordingly, it is on the surfaces of pipes and other equipment with which the fluid comes into contact that mineral ions most frequently undergo their phase change to solids. The solids form on, and adhere to, these surfaces, creating scale.

When scale builds up in a pipe or other conduit, it alters the flow of the fluid. By decreasing the volume of fluid that flows through a pipe, scale requires pumps and other industrial equipment to use more energy in order to transport the same volume of fluid. Scale may also increase pressure in a pipe, which can cause leaks and breakages. Because heat provides energy to fuel the ions' phase change to solid, scale build-up on heated equipment, such as steam boilers and heat exchangers, is especially problematic. Scale formation on these devices may lead to reduced heat transmission, higher fuel usage, and even local overheating and failure. The build-up of scale also may have a number of indirect effects, such as providing a location for bacteria to build up in the fluid-containing system and interacting with soap to prevent cleaning of the fluid-containing system.

A number of methods to resist scale formation and build-up are known in the art. For instance, chemical solutions have been introduced into fluid-containing systems. The use of chemical solutions, however, is undesirable both because it requires constant replenishment and because it contaminates the fluid. Accordingly, a number of physical water treatment methods have been identified. One physical water treatment method involves positioning electrodes in the fluid-containing system. However, as the electrodes erode, they lose their effectiveness and need to be replaced. Another method involves the positioning of magnets in direct contact with the fluid. However, the magnets collect magnetic debris which, itself, can obstruct the pipe.

Another method of physical water treatment involves the creation of an electromagnetic field, either exteriorly and/or interiorly of a piping system. An electromagnetic signal prevents the formation and build-up of scale by providing energy to the ions, causing them to undergo a phase shift to a solid state within the fluid. Accordingly, the ions stick to each other, rather than to the internal surfaces of pipes and other equipment. As such, they continue to flow through the fluid-containing system and do not build up in the fluid-containing system.

This method of treatment is disclosed, for example, in U.S. Pat. No. 5,514,283. There, an electromagnetic field is created in a fluid-containing system in different ways. One method involves a primary winding of electrical wire, to which an energizing means is connected, and a secondary winding of electrical wire. The primary and secondary windings are separated by a ferrite core. The secondary winding has a pair of terminals, which are placed in electrical contact with a fluid-containing conduit at axially spaced-apart contact zones. A conductive path extends along the conduit between the two contact zones, creating a low voltage, high current signal between the terminals. The high current generates an electromagnetic field that propagates along the conduit in both directions from the contact zones. In another method, a ferrite core is coiled co-axially or spirally around the conduit in a manner so as to extend through a primary winding of electrical wire. In this method, the electromagnetic field is achieved by making the pipe itself and/or the fluid therein serve as the secondary winding.

In many applications of physical water treatment involving an electromagnetic field, it is necessary to have the electromagnetic field freely propagate throughout the fluid-containing system. However, the propagation of an electromagnetic field across large distances in a fluid-containing system has often been difficult and/or impossible to achieve with known methods and devices. For instance, piping configurations in the fluid-containing system create hidden return paths which effectively force the electromagnetic field to a loop, leaving significant portions of the system untreated.

SUMMARY OF THE INVENTION

An embodiment of the present invention comprises a method and apparatus for protecting a fluid-containing system from scale deposits. In this embodiment, a radio frequency signal is injected into a fluid-containing system in order to provide propagation of an electromagnetic signal throughout the fluid-containing system. By operatively connecting one terminal of a secondary coil of a transformer to the fluid-containing system and another terminal to ground, an embodiment of the present invention prevents the electromagnetic signal from becoming forced to a loop. The present invention thus provides an improved method and apparatus for protecting a fluid-containing system against the formation and build-up of scale.

In another embodiment of the present invention, a radio frequency signal is injected into a number of independent fluid-containing systems using a single treatment device. Using known methods, one would be forced to separately install an individual treatment device on each fluid-containing system to be treated. However, an embodiment of the present invention overcomes this disadvantage. By operably connecting one end of a secondary coil of the transformer to ground, the other end of the secondary coil may be split to provide a number of terminals. Each of these terminals may be operably connected to an individual load, each load comprising an independent fluid-containing system. An embodiment of the present invention thus provides a method and apparatus for protecting a number of fluid-containing systems against the formation and build-up of scale using a single treatment device.

In another embodiment of the present invention, a radio frequency signal is injected into a fluid-containing system in order to prevent the proliferation of bacteria. Although not being limited by any theory of operation, it is believed that the pulsed radio frequency signal serves to prevent the proliferation of bacteria by immobilizing existing bacteria in the fluid-containing system. Bacteria configure themselves to a polarity that matches that of their surrounding environment. Thus, when their environment undergoes a change in polarity, the bacteria undergo a corresponding change. By injecting a pulsed radio frequency signal into a fluid-containing system, the polarity of the bacteria's environment is brought into a constant state of flux. It is believed that the bacteria cannot keep up with the changes in the polarity of their environment, and become immobilized. The validity and scope of this embodiment of the invention, however, are not limited by any particular theory of operation.

BRIEF DESCRIPTION OF THE DRAWINGS

A clear conception of the advantages and features of one or more embodiments will become more readily apparent by reference to the exemplary, and therefore non-limiting, embodiments illustrated in the drawings:

FIG. 1 is an electronic circuit diagram of an embodiment of the present invention operably connected to a fluid-containing conduit.

FIG. 2 is an electronic circuit diagram of an embodiment of the present invention operably connected to a number of fluid-containing conduits.

FIG. 3 is an electronic circuit diagram of a system for generating and injecting a pulsed radio frequency signal into a fluid-containing system in accordance with an embodiment of the present invention.

FIG. 4 is an electronic circuit diagram of a system for generating and injecting a pulsed radio frequency signal into a fluid-containing system in accordance with another embodiment of the present invention.

DETAILED DESCRIPTION OF THE INVENTION

The formation and build-up of scale is a problem that affects many industries. An embodiment of the present invention provides safe and efficient fluid treatment and can easily be installed to any fluid-containing system. An embodiment of the present invention may be particularly useful in treating, for example, cooling towers, oil and natural gas wells, geothermal wells, boilers, and any other heat exchangers that utilize fluids or fluid containing piping systems where scaling occurs. Moreover, an embodiment of the present invention may be used to prevent the proliferation of bacteria in fluid-containing systems, for example, pools and spas, beer lines, cooling towers, dairies, sea water cooling systems, or any other fluid containing piping system where bio-fouling occurs.

According to the present invention, a pulsed radio frequency signal is injected to a fluid-containing system. By injecting a pulsed radio frequency signal into a fluid-containing system, an embodiment of the invention propagates an electromagnetic field throughout the fluid-containing system. Therefore, an embodiment of the present invention provides physical water treatment without the need for chemicals, electrodes, magnets or other descaling devices mounted within the fluid-containing system. Additionally, an embodiment of the present invention operates on little energy and requires little to no on-going maintenance.

In order to obtain a propagation of the electromagnetic field throughout the system, the signal preferably has the characteristics of an oscillating, exponentially decaying waveform. The frequency of the signal can be selected to achieve a desired propagation for a particular fluid-containing system. Preferably the frequency of the signal is selected to be between about 100 and 200 KHz. More preferably, the frequency of the signal is selected to be between about 120 and 180 kHz.

The signal is created in bursts, or pulses, which are preferably repeated at variable, pseudo-random intervals. Each pulse preferably has a frequency between 5 KHz and 20 KHz. Accordingly, in a preferred embodiment, the pulses are repeated between 5,000 and 20,000 times per second.

An embodiment of the invention is illustrated in FIG. 1. In this embodiment, a pulsed radio frequency signal, as described above, is introduced in the primary coils 3 of a transformer 1. The transformer 1 transfers the signal to the secondary coils 5. The signal is then injected into a fluid-containing system 7 by a connection between the system and a first terminal of a secondary coil of the transformer 9. Because the fluid-containing system acts as a load, this terminal 9 may also be referred to as a load terminal. In order to provide a low impedance to balance the load presented by the fluid-containing system 7, a second terminal of the secondary coil 11 is operably connected to ground. Accordingly, this terminal 11 may be referred to as a ground terminal.

In a preferred embodiment, the transformer 1 is a toroidal transformer, having a core 17 that comprises a ferrite ring. This type of transformer 1 operates particularly well at high frequencies. Preferably, at least the secondary coil 5 of the toroidal transformer 1 is formed by wrapping a number of turns of electrical wire around the ferrite ring core 17. By using wire as the secondary coil 5 of the transformer, the treatment device of the preferred embodiment may be operably connected to a fluid-containing system with ease. Where the secondary coil 5 is formed in this way, the load terminal 9 and the ground terminal 11 are preferably located at opposite ends of the wire that forms the secondary coil 5. Alternatively, a standard transformer unit may be used. In that case, a load terminal 9 may be connected, via electrical wire, to one tap of the secondary coil 5 and a ground terminal 11 may be connected, via electrical wire, to another tap of the secondary coil. The number of turns of secondary coil 5 between the two taps may be selected to achieve a signal having desired properties.

The transformer may have a varying number of turns of primary coil 3 and secondary coil 5. Generally, few turns of both primary coil and secondary coil are needed. By selecting a particular ratio of turns, one may either increase or decrease the voltage that is used in treating the fluid-containing system 7.

In an embodiment of the invention, a load terminal 9 of the secondary coil 5 is connected to a pipe or other conduit 13 through which a fluid flows. Preferably, the conduit 13 is made of conductive material, in which case a load terminal 9 may be operably connected to the fluid-containing system 7 by contact between the terminal and the conduit. In other embodiments, however, the conduit 13 may be made of a non-conductive material. Where the conduit 13 is non-conductive, a load terminal 9 may be operatively connected to the fluid-containing system 7 in a number of ways. For example, a conductive material may be inserted to a section of the conduit 13, and a load terminal 9 brought into contact with the conductive insert. Alternatively, a conductive material may be clamped around a section of the conduit 13 and a load terminal 9 brought into contact with the conductive material, allowing injection of the signal by capacitance.

The ground terminal 11 is operably connected to ground to form a current return path from one side of the secondary coil 5 to the other. The load terminal 9 is operably connected to the fluid-containing system 7, which is, itself, coupled to ground. Accordingly, so as not to provide a specific point for the return path and thereby reduce the potential propagation of the signal, the ground terminal 11 is operably connected to ground through a capacitor 15.

In an embodiment of the present invention, a single treatment device is used to treat multiple fluid-containing systems. This embodiment is illustrated in FIG. 2. Here, the electrical wire at one end 19 of a secondary coil 5 of a transformer is split to provide multiple load terminals 9. Each load terminal 9 is operably connected to an independent fluid-containing system 7 to provide the desired treatment.

The radio frequency signal may be generated and introduced in the primary coils of a transformer in a number of ways. In one preferred embodiment, a microcontroller having a digital to analogue converter directly synthesizes the signal as a pulsed waveform having the desired characteristics. The signal is then amplified, if necessary, and fed to the primary coil of the transformer. The signal is injected into the fluid-containing system as described above.

An example of this embodiment is illustrated in FIG. 3. A microcontroller equipped with a digital to analogue converter (DAC) 19 generates, at three volts, a signal 21, which comprises an oscillating waveform having a desired frequency and which is pulsed pseudo-randomly. The signal 21 is then shifted and amplified up to twelve volts by a preamplifier 23 and fed to a power amplifier 25, which raises the current of signal so that it can drive a high-frequency transformer 1. The resulting signal 27 is introduced to the primary coils 3 of the high-frequency transformer 1. The signal is injected into the fluid-containing system 7 as described above.

In another preferred embodiment, a microcontroller produces short high-current pulses. The short high-current pulses are then shifted and amplified, if necessary, before being switched into a series resonant LC circuit. The LC circuit comprises a high-voltage capacitor and the primary coils of a transformer, which act as the inductor. When charged by the pulse, the LC circuit generates an oscillating waveform having a particular frequency. By selecting the values of inductance (L) and capacitance (C), a user may preselect a frequency that is optimized for treatment of the particular fluid-containing system. The signal is injected into the fluid-containing system as described above.

An example of this embodiment is illustrated in FIG. 4. A microcontroller 29 generates, at three volts, short high-current pulses 31 at a frequency that ranges pseudo-randomly between 5 and 20 KHz. The pulses 31 are then shifted up to twelve volts and the current is amplified by a circuit control processor 33. The amplified pulses 35 are fed to the base of a bipolar transistor 37, where they are switched into a series resonant LC circuit 39, comprising a capacitor 41 and the primary coils 3 of a high-frequency transformer 1. The values of inductance (L) and capacitance (C) are selected to produce an oscillating waveform having a frequency between 100 and 200 KHz. Accordingly, a signal 43, which comprises an oscillating waveform with a frequency between 100 and 200 KHz, and that is pulsed pseudo-randomly between the ranges of 5 to 20 KHz, is introduced in the primary coils 3 of a transformer 1. The signal is injected into the fluid-containing system 7 as described above.

It can be seen that the described embodiments provide a unique and novel method and system for injecting a radio frequency signal into a fluid-containing system that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of injecting a radio frequency signal into a fluid-containing system to resist the formation and build-up of scale deposits in the system, the method comprising the steps of introducing a pulsed radio frequency signal in a primary coil of a transformer, and injecting the signal into a fluid-containing system through an operative connection between a first terminal of a secondary coil of the transformer and a conduit of the fluid-containing system;

wherein a second terminal of the secondary coil of the transformer is operably connected to ground; and wherein, in use, the method causes propagation of an electromagnetic signal in the conduit, thereby resisting the formation and build-up of scale deposits in the fluid-containing system.

2. The method of claim 1, wherein the signal has a frequency between 100 and 200 kHz.

3. The method of claim 2, wherein the signal has a frequency between 120 and 180 kHz.

4. The method of claim 1, wherein the signal is pulsed randomly in the range of 5 to 20 kHz.

5. The method of claim 1, wherein the transformer is a toroidal transformer having a ferrite ring core.

6. The method of claim 1, wherein the fluid-containing system comprises a conductive conduit and the signal is injected into the fluid-containing system through a connection between the first terminal and the conductive conduit.

7. The method of claim 1, wherein the fluid-containing system comprises a non-conductive conduit and the signal is injected into the fluid-containing system through a connection between the first terminal and a conductive material inserted to a section of the non-conductive conduit.

8. The method of claim 1, wherein the fluid-containing system comprises a non-conductive conduit and the signal is injected into the fluid-containing system through a connection between the first terminal and a conductive material clamped onto a section of the non-conductive conduit.

9. The method of claim 1, wherein the second terminal of the secondary coil is operably connected to ground through a capacitor.

10. The method of claim 1, further comprising the step of generating a pulsed radio frequency signal.

11. The method of claim 10, wherein the pulsed radio frequency signal is generated by a microcontroller having a digital to analog converter.

12. The method of claim 11, wherein the pulsed radio frequency signal is increased in voltage and/or amplified before it is introduced to the primary coil of the transformer.

13. The method of claim 10, wherein the pulsed radio frequency signal is generated by a series LC circuit, in which the primary coil of the transformer acts as an inductor.

14. The method of claim 13, wherein the step of generating a pulsed radio frequency signal further comprises generating a pulsed current, and switching the pulsed current into the series LC circuit.

15. The method of claim 14, wherein the pulsed current is shifted and amplified before it is switched into the series LC circuit.

16. A method of injecting a radio frequency signal into a fluid-containing system to resist the formation and build-up of scale deposits in the system, the method comprising the steps of:

providing a transformer having a primary coil and a secondary coil, the secondary coil having a first terminal and a second terminal;

operatively connecting the first terminal of the secondary coil to a conduit of the fluid-containing system;

operably connecting the second terminal of the secondary coil to ground;

introducing a pulsed radio frequency signal in the primary coil of a transformer;

injecting the signal into the fluid-containing system through the operative connection between the first terminal of the secondary coil and the conduit in the fluid-containing system; and in response to injecting the signal into the fluid-containing system, propagating an electromagnetic signal in the conduit, thereby resisting the formation and build-up of scale deposits in the fluid-containing system.

17. A method of treating a fluid-containing system in order to resist the formation and build-up of scale deposits, comprising:

providing a transformer having a primary coil and a secondary coil, the secondary coil having a first terminal and a second terminal;

operatively connecting the first terminal of the secondary coil to a conduit of the fluid-containing system;

operably connecting the second terminal of the secondary coil to ground;

introducing a pulsed radio frequency signal in the primary coil of a transformer;

injecting the signal into the fluid-containing system through the operative connection between the first terminal of the secondary coil and the conduit in the fluid-containing system; and in response to injecting the signal into the fluid-containing system, propagating an electromagnetic signal in the conduit, thereby resisting the formation and build-up of scale deposits in the fluid-containing system.

* * * * *